US008440743B2

(12) United States Patent
Oyanagi et al.

(10) Patent No.: US 8,440,743 B2
(45) Date of Patent: May 14, 2013

(54) OIL-BASED INK COMPOSITION FOR INK-JET RECORDING

(75) Inventors: Takashi Oyanagi, Shiojiri (JP); Keitaro Nakano, Matsumoto (JP); Kiyohiko Takemoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 587 days.

(21) Appl. No.: 12/016,637

(22) Filed: Jan. 18, 2008

(65) Prior Publication Data

US 2008/0173214 A1 Jul. 24, 2008

(30) Foreign Application Priority Data

| Jan. 19, 2007 | (JP) | 2007-010673 |
| Mar. 5, 2007 | (JP) | 2007-054383 |
| Oct. 18, 2007 | (JP) | 2007-271361 |

(51) Int. Cl.
*A61K 9/16* (2006.01)
*B41J 2/01* (2006.01)
*B41J 2/17* (2006.01)
*B41J 2/175* (2006.01)
*B60C 1/00* (2006.01)
*C08F 290/06* (2006.01)

(52) U.S. Cl.
USPC ............ 523/160; 347/1; 347/85; 347/95; 347/100; 523/161; 523/216

(58) Field of Classification Search ........ 523/160, 523/161, 218; 524/543, 556, 558, 560, 265, 524/366; 347/1, 85, 95, 100
See application file for complete search history.

(56) References Cited

U.S. PATENT DOCUMENTS

| 4,089,800 A | 5/1978 | Temple |
| 4,427,836 A | 1/1984 | Kowalski et al. |
| 4,594,363 A | 6/1986 | Blankenship et al. |
| 4,880,456 A | 11/1989 | Kolassa et al. |
| 5,229,209 A | 7/1993 | Gharapetian et al. |
| 6,251,175 B1 | 6/2001 | Zhu et al. |
| 6,302,537 B1 * | 10/2001 | Kato ............................ 347/100 |
| 6,348,530 B1 * | 2/2002 | Reck et al. .................... 524/244 |
| 7,399,350 B2 * | 7/2008 | Rajaraman et al. ........ 106/31.59 |
| 2004/0006159 A1 | 1/2004 | Horie et al. |

FOREIGN PATENT DOCUMENTS

| EP | 1 371 688 A2 | 12/2003 |
| EP | 1942157 A2 | 7/2008 |
| EP | 1942158 A2 | 7/2008 |
| JP | 2003-313481 A | 11/2003 |
| JP | 2004-250659 A | 9/2004 |
| JP | 2005-23299 A | 1/2005 |
| JP | 2005-290362 A | 10/2005 |
| JP | 2005-314655 A | 11/2005 |
| JP | 2007-238716 A | 9/2007 |
| WO | 02055619 A1 | 7/2002 |
| WO | 02100652 A1 | 12/2002 |
| WO | 2006/095556 A1 | 9/2006 |
| WO | EP 1857513 | * 11/2007 |

OTHER PUBLICATIONS

Extended European Search Report dated Apr. 14, 2008.

* cited by examiner

*Primary Examiner* — Patrick Niland
(74) *Attorney, Agent, or Firm* — Sughrue Mion, PLLC

(57) ABSTRACT

The present invention provides an oil-based ink composition for ink-jet recording comprising at least a coloring material, an organic solvent and a non-aqueous resin emulsion.

9 Claims, No Drawings

OIL-BASED INK COMPOSITION FOR INK-JET RECORDING

FIELD OF THE INVENTION

The present invention relates to an oil-based ink composition for ink-jet recording. More particularly, it relates to an oil-based ink composition having excellent image quality and fixability which contains polymer resin fine particles.

BACKGROUND OF THE INVENTION

Various ink-jet recording methods such as a method of discharging an ink by utilizing electrostatic attracting force (electric-field controlling method), a method of discharging an ink by utilizing driving pressure of a piezoelectric element (drop-on-demand method or pressure pulse method), and a method of discharging an ink by utilizing pressure generated by forming gas bubbles with high heat and growing the same (bubble or thermal jet method) are known as an ink-jet recording method. An extremely high definition image can be obtained by those methods. Furthermore, in those ink-jet recording methods, a water-based ink using water as the main solvent and an oil-based ink using an organic solvent as the main solvent are generally used.

A printed image obtained using a water-based ink is generally poor in water resistance, and it is difficult to print an image on a recording medium having water-resistant surface. Contrary to this, an oil-based ink has various advantages such that it can provide a printed image having excellent water resistance, and additionally, it facilitates printing on a recording medium having water-resistant surface and a high-quality paper. Furthermore, an oil-based ink using a pigment as a coloring material has excellent light resistance. Even though those advantages, further improvement in properties such as fixability, durability, wear resistance and curability has been desired with the expansion of applications of the oil-based ink. In particular, where the coloring material is white, further improvement in properties such as fixability, durability, wear resistance and curability is desired, in addition to improvement of image in terms of whiteness and shielding property.

A technique in which a resin which dissolves in a solvent is used and the resin bonds and fixes a pigment and a recording medium at the time when the solvent is dried, is disclosed as a method of increasing fixability of a pigment to a recording medium (for example, see Patent Document 1). The larger the molecular weight of the resin which dissolves in a solvent, the more excellent the fixability and strength when dried, but this is accompanied with a great increase of the viscosity of an ink composition. As a result, discharge property of an ink composition is decreased, and in an extreme case, a nozzle is clogged and an ink composition cannot be discharged. A resin having a low molecular weight can suppress the increase of viscosity, but fixability and strength of an ink composition are decreased. Additionally, where the amount of a resin present in a solvent in a dissolved state is excess, it induces discharge defects such as flight deflection and scattering, regardless of a molecular weight of a resin.

In view of the above, a technique of adding an emulsion or a suspension, having resin fine particles dispersed in a dispersion medium (hereinafter simply referred to as a "resin emulsion" without distinguishing an emulsion and a suspension), to an ink composition is proposed (for example, see Patent Documents 2 to 5). However, unlike a water-based ink composition comprising water as the main component, an oil-based ink composition greatly changes its properties depending on the kind of a solvent used. Therefore, it is necessary to appropriately select a resin emulsion suitable to the kind of a resin emulsion and a dispersion medium used.

Patent Document 1: WO02/100652
Patent Document 2: JP-A-2004-250659
Patent Document 3: JP-A-2005-23299
Patent Document 4: JP-A-2005-290362
Patent Document 5: JP-A-2005-314655

SUMMARY OF THE INVENTION

The present invention has an object to provide an oil-based ink composition for ink-jet recording, which suppresses a viscosity increase, has excellent discharge property and fixability to a recording medium, and provides a printed matter having good image quality.

As a result of extensive and intensive investigations, the present inventors have found that good fixability and good image quality are obtained by using an oil-based ink composition comprising at least:

(1) an alkyl glycol ether solvent having excellent ink jet properties, and (2) a polyacryl polyol resin emulsion (non-aqueous resin emulsion) in which a dispersion medium comprises an aliphatic hydrocarbon compound and/or an alicyclic hydrocarbon compound which are/or is a petroleum solvent.

The present invention has been achieved based on this finding.

It has been further found that where the above oil-based ink composition is a white ink, an image quality having excellent high whiteness and high shielding property, and good fixability are obtained by containing a white hollow resin emulsion as a coloring material.

That is, the above object can be achieved by the following constitutions.

(1) An oil-based ink composition for ink-jet recording comprising at least a coloring material, an organic solvent and a non-aqueous resin emulsion.

(2) The oil-based ink composition for ink-jet recording as described in (1) above, wherein a resin constituting the non-aqueous resin emulsion is a polyacryl polyol resin.

(3) The oil-based ink composition for ink-jet recording as described in (1) or (2) above, wherein a dispersion medium of the non-aqueous resin emulsion is an aliphatic hydrocarbon and/or an alicyclic hydrocarbon.

(4) The oil-based ink composition for ink-jet recording as described in (3) above, wherein the aliphatic hydrocarbon is a linear alkane and/or a branched alkane.

(5) The oil-based ink composition for ink-jet recording as described in (3) above, wherein the alicyclic hydrocarbon is an alkyl cyclohexane.

(6) The oil-based ink composition for ink-jet recording as described in any one of (1) to (5) above, which is a white ink wherein the coloring material contains a hollow resin emulsion.

(7) The oil-based ink composition for ink-jet recording as described in (6) above, wherein the hollow resin emulsion contains hollow resin particles which are fine particles having an average particle size of from 0.3 to 1.0 μm.

(8) The oil-based ink composition for ink-jet recording as described in (6) or (7) above, wherein the hollow resin emulsion contains hollow resin particles in an amount of from 0.5 to 25% by weight based on the weight of the whole ink composition.

According to the present invention, a non-aqueous oil-based ink composition having excellent image quality and fixability can be provided.

DETAILED DESCRIPTION OF THE INVENTION

The ink composition of the present invention is an oil-based ink composition for ink-jet recording comprising at least a coloring material, an organic solvent and a non-aqueous resin emulsion.

In the oil-based ink composition of the invention, the coloring material can use pigments and/or dyes generally used in the conventional oil-based ink composition.

Those pigments and/or dyes can be used alone or as mixtures of two or more thereof.

The pigment can use inorganic pigments or organic pigments. Specific examples of the pigment that can be used include carbon black, cadmium red, molybdenum red, chromium yellow, cadmium yellow, titanium yellow, chromium oxide, pyridiane, titanium cobalt green, ultramarine blue, Prussian blue, cobalt blue, diketopyrrolopyrrole, anthraquinone, benzimidazolone, anthrapyrimidine, azo pigment, phthalocyanine pigment, quinacridone pigment, isoindolinone pigment, dioxadine pigment, surene pigment, perylene pigment, perynone pigment, thioindigo pigment, quinophthalone pigment and metal complex pigment.

An average particle size of the above pigment particles is not particularly limited, but is preferably from 50 to 500 nm.

Examples of the dye that can be used include azo dye, metal complex salt dye, naphthol dye, anthraquinone dye, indigo dye, carbonium dye, quinoneimine dye, xanthene dye, cyanine dye, quinoline dye, nitro dye, nitroso dye, benzoquinone dye, naphthoquinone dye, phthalocyanine dye and metal phthalocyanine dye. An oil-soluble dye is particularly preferred.

In the oil-based ink composition of the invention, the content of the coloring material can appropriately be selected according to applications and printing properties, but is preferably from 0.5 to 25% by weight, more preferably from 0.5 to 15% by weight, and most preferably from 1 to 10% by weight, based on the weight of the whole ink composition.

The oil-based ink composition of the invention preferably contains a hollow resin emulsion as the coloring material.

The hollow resin emulsion in the invention is an oil-based dispersion of hollow resin fine particles, and the hollow resin fine particle is preferably a white coloring material. The hollow resin fine particle has a particle size of preferably from 0.3 to 1.0 μm.

The hollow resin particles can use the same particles as the hollow resin fine particles described in Japanese Patent Application No. 2006-061511.

Preparation method of the hollow resin fine particles used in the invention is not particularly limited, and can use various conventional methods. The preparation method is described in, for example, U.S. Pat. No. 4,880,465, JP-A-2003-313481, and U.S. Pat. Nos. 5,229,209, 4,594,363, 4,427,836 and 4,089,800. Furthermore, various hollow resin fine particles are commercially available. The preparation method of the hollow resin fine particles, and design method of pore size or outer diameter are also conventional, and are described in, for example, the above-described references. The hollow resin fine particles are typically prepared according to the general emulsion polymerization technique. Furthermore, the hollow resin fine particles can be prepared as a stable dispersion system comprising the individual hollow fine particle dispersed in an organic solution medium (described hereinafter). The dispersion thus obtained has good dispersibility imparted thereto, without requiring pulverization operation and grinding operation that are required in preparing the general pigment ink composition, and can be utilized in, for example, preparation of an ink composition for ink-jet recording.

Vinyl monomer that can be used in preparation of the hollow resin fine particles can include nonionic monoethylenically unsaturated monomers, and examples thereof include styrene, vinyltoluene, ethylene, vinyl acetate, vinyl chloride, vinylidene chloride, acrylonitrile, (meth)acryl amide, and various esters of (meth)acrylic acid such as methyl acrylate (MA), methyl methacrylate (MMA), ethyl acrylate (EA) or butyl acrylate (BA), for example, (C1-C20) alkyl or (C3-C20) alkenyl esters. Examples of the (meth)acrylic acid ester that can be used include acryl esters such as methyl methacrylate (MMA), methyl acrylate (MA), ethyl (meth)acrylate (EMA), butyl (meth)acrylate (BMA), 2-hydroxyethyl methacrylate (HEMA), 2-ethylhexyl (meth)acrylate (EHMA), benzyl (meth)acrylate, lauryl (meth)acrylate, oleyl (meth)acrylate, palmityl (meth)acrylate or stearyl (meth)acrylate.

A bifunctional vinyl monomer such as divinyl benzene, acryl methacrylate, ethylene glycol dimethacryalte, 1,3-butane-diol dimethacrylate, diethylene glycol dimethacrylate or trimethylolpropane trimethacryate can be copolymerized to crosslink, thereby forming an outer shell (resin film).

The hollow resin emulsion according to the invention can be prepared as a dispersion system comprising the hollow resin fine particles dispersed in an organic solution medium. The organic solution medium that can preferably be used include polar organic solvents such as alcohols (methyl alcohol, ethyl alcohol, propyl alcohol, butyl alcohol, isopropyl alcohol, fluorinated alcohol and the like), ketones (acetone, methyl ethyl ketone, cyclohexanone and the like), carboxylic acid esters (methyl acetate, ethyl acetate, propyl acetate, butyl acetate, methyl propionate, ethyl propionate and the like), and ethers (diethyl ether, dipropyl ether, tetrahydrofuran, dioxane and the like).

More preferred organic solution medium includes a mixture of a diethylene glycol compound which is liquid at ordinary temperature under ordinary pressure, and a dipropylene glycol compound which is liquid at ordinary temperature under ordinary pressure, as described in WO2002/055619. Specifically, diethylene glycol diethyl ether and dipropylene glycol monoethyl ether can be used in combination. Furthermore, triethylene glycol monomethyl ether, triethylene glycol dimethyl ether, triethylene glycol monobutyl ether, tetraethylene dimethyl ether, tetraethylene monobutyl ether and the like can be used.

When the hollow resin emulsion is used as the coloring material, the content of the hollow resin fine particles in the hollow resin emulsion is preferably from 0.5 to 25% by weight, and more preferably from 5 to 25% by weight, based on the weight of the whole ink composition.

The oil-based ink composition of the invention contains the non-aqueous resin emulsion.

Even thought the non-aqueous resin emulsion (non-aqueous polymer resin fine particles are dispersed) used in the invention is added to an ink composition, the resin fine particles are insoluble, and therefore, remarkable viscosity increase as in the case of adding a soluble polymer compound is not induced. As a result, deterioration of discharge property due to resin addition can be suppressed.

The resin (non-aqueous polymer resin) constituting the non-aqueous resin emulsion is not particularly limited. However, urethane and acrylic resins are preferred, and a polyacryl polyol resin is more preferred.

Dispersion medium of the non-aqueous resin emulsion is not particularly limited. However, an aliphatic hydrocarbon or an alicyclic hydrocarbon alone or a mixture of those is preferred, and the mixture of those is more preferred.

The aliphatic hydrocarbon is preferably a linear alkane or a branched alkane. Those may be used alone or mixtures of two or more thereof.

The linear alkane is preferably an alkane having from 5 to 15 carbon atoms, and examples thereof include n-pentane, n-hexane, n-heptane, n-octane, n-nonane, n-decane and n-undecane. The branched alkane is preferably an alkane having from 5 to 15 carbon atoms, and examples thereof include 2,3-dimethylbutane, 2-methylhexane, 3-methylheptane, 3-methylhexane and 2,3-dimethylpentane.

The alicyclic hydrocarbon is preferably an aliphatic hydrocarbon having from 5 to 15 carbon atoms. Cyclopentane, cyclohexane, cycloheptane, cyclooctane and compounds in which hydrogen in those compounds is substituted with an alkyl group are preferred, and an alkyl cyclohexane in which hydrogen in cyclohexane is substituted with an alkyl group is more preferred.

Petroleum solvents generally widely used contain benzene, toluene and xylene that are harmful, and use of such solvents is not preferred from the standpoint of environment. From this point, it is preferred to use a mixed solvent comprising the above-described aliphatic hydrocarbon compounds and alicyclic hydrocarbon compounds.

The resin emulsion dispersed with a dispersion medium is commercially available. For example, N-2043-AF-1 and N-2043-60MEX, products of Harima Chemicals, Inc., can be used as the emulsion of a polyacryl polyol (polyacryl polyol fixing resin), and SANPRENE IB-F370 and SAMPRENE IB-501, products of Sanyo Chemical Industries, Ltd., can be used as the emulsion of a urethane resin (polyurethane fixing resin).

N-2043-AF-1 described above is a resin emulsion in which a polyacryl polyol resin is dispersed in a mixed solvent comprising C9 and C10 alkyl cyclohexanes as the main component, and N-2043-60MEX described above is also a polyacryl polyol resin. SANPRENE IB-F370 described above is a resin emulsion in which a urethane resin is dispersed in a solvent comprising propylene glycol monomethyl ether as the main component, and SANPRENE IB-501 is a resin emulsion in which a urethane resin is dispersed in a mixed solvent comprising ethyl acetate and isopropyl alcohol.

The oil-based ink composition of the invention preferably contains at least any one of an alkylene glycol compound that is liquid at ordinary temperature under ordinary pressure and a lactone, as an organic solvent, and more preferably contains the alkylene glycol compound as an organic solvent.

The alkylene glycol compound is preferably an ethylene glycol compound or a propylene glycol compound, as described in WO2002/055619.

Examples of the preferred ethylene glycol compound include ethylene glycol, diethylene glycol, triethylene glycol, tetraethylene glycol, and a monoether or a diether of a polyethylene glycol, and a diethylene glycol compound is more preferred.

Examples of the preferred propylene glycol compound include propylene glycol, dipropylene glycol, tripropylene glycol, and a monoether or a diether of a polypropylene glycol, and a dipropylene glycol compound is more preferred.

The diethylene glycol compound can use, for example, a diethylene glycol compound represented by the following general formula (I).

$$R^{11}\text{—O—}C_2H_4\text{—O—}C_2H_4\text{—O—}R^{12} \quad (I)$$

wherein $R^{11}$ and $R^{12}$ each independently represent a hydrogen atom, an alkyl group having from 1 to 4 carbon atoms or an $R^{13}CO$ group wherein $R^{13}$ represents an alkyl group having from 1 to 4 carbon atoms.

The dipropylene glycol compound can use, for example, a dipropylene glycol compound represented by the following general formula (II).

$$R^{21}\text{—O—}C_3H_6\text{—O—}C_3H_6\text{—O—}R^{22} \quad (II)$$

wherein $R^{21}$ and $R^{22}$ each independently represent a hydrogen atom, an alkyl group having from 1 to 4 carbon atoms or an $R^{23}CO$ group wherein $R^{23}$ represents an alkyl group having from 1 to 4 carbon atoms.

The term "alkyl group having from 1 to 4 carbon atoms" used herein means a linear or branched alkyl group, and can be, for example, a methyl group, an ethyl group, an n-propyl group, an iso-propyl group, an n-butyl group, an iso-butyl group, a sec-butyl group or a tert-butyl group.

The lactone is preferably a lactone having 6 or less carbon atoms, and examples of the preferred lactone include β-propiolactone, β-butyrolactone, γ-butyrolactone, γ-valerolactone and ε-caprolactone.

The diethylene glycol compound, dipropylene glycol compound and lactone that can be used in the oil-based ink composition of the present invention each have a boiling point of preferably 150° C. or higher, and more preferably 180° C. or higher, under ordinary pressure.

The diethylene glycol compound and dipropylene compound that can be used in the oil-based ink composition of the invention each have a vapor pressure at 20° C. of preferably 1 hPa or lower, and more preferably 0.7 hPa or lower. When the diethylene glycol compound and dipropylene compound satisfying the above-described conditions of high boiling point and low vapor pressure are used, load to provide local exhaust facilities and exhaust gas treatment facilities is reduced, and this makes it possible to improve working environment, and additionally, to reduce environmental load to ambient environment.

Examples of the preferred diethylene glycol compound that can be used in the oil-based ink composition of the invention include diethylene glycol; diethylene glycol ethers (particularly an alkyl ether) such as diethylene glycol monomethyl ether, diethylene glycol dimethyl ether, diethylene glycol methylethyl ether, diethylene glycol monoethyl ether, diethylene glycol diethyl ether, diethylene glycol mono-n-butyl ether or diethylene glycol di-n-butyl ether; and diethylene glycol esters such as diethylene glycol monoethyl ether acetate, diethylene glycol mono-n-butyl ether acetate or diethylene glycol monoacetate. Of those, diethylene glycol, diethylene glycol monomethyl ether, diethylene glycol monoethyl ether, diethylene glycol diethyl ether, diethylene glycol mono-n-butyl ether, diethylene glycol di-n-butyl ether, diethylene glycol monoethyl ether acetate and diethylene glycol monobutyl ether acetate are preferred.

Examples of the preferred dipropylene glycol compound that can be used in the oil-based ink composition of the invention include dipropylene glycol; and dipropylene glycol ethers (particularly an alkyl ether) such as dipropylene glycol monomethyl ether or dipropylene glycol monoethyl ether.

The oil-based ink composition of the invention preferably contains the diethylene glycol compound, and the content thereof can appropriately be selected according to the printing properties, but is preferably from 20 to 80% by weight based on the weight of the whole ink composition.

In addition to the diethylene glycol compound, the dipropylene glycol compound, the lactone or their mixtures, the oil-based ink composition of the invention can further contain a polyethylene glycol monoether compound which is liquid at ordinary temperature under ordinary pressure represented by the following general formula (III) as an organic solvent.

$$R^{31}\text{—O—}(C_2H_4\text{—O})_n\text{—H} \quad (III)$$

wherein R³¹ represents an alkyl group having from 1 to 6 carbon atoms (preferably, an alkyl group having from 1 to 4 carbon atoms), and n is an integer of from 3 to 6.

The term "alkyl group having from 1 to 6 carbon atoms" used herein means a linear or branched alkyl group, and can be, for example, a linear or branched pentyl group or a linear or branched hexyl group, in addition to the "alkyl group having from 1 to 4 carbon atoms" described before.

The polyethylene glycol monoether compound that can be used in the oil-based ink composition of the invention has a boiling point of preferably 200° C. or higher, and more preferably 250° C. or higher, under ordinary pressure. Furthermore, the polyethylene glycol monoether compound that can be used in the oil-based ink composition of the invention has a flash point of preferably 100° C. or higher, and more preferably 130° C. or higher. When such a polyethylene glycol monoether compound is used, volatilization inhibition property can be imparted to the oil-based ink composition of the invention. For example, when volatilization of the ink composition is inhibited in a tube which transports an ink composition to a printer head from an ink cartridge, accumulation of a solid content can be prevented or reduced in the tube.

Examples of the preferred polyethylene glycol monoether compound include a triethylene glycol monoether compound (such as triethylene glycol monomethyl ether or triethylene glycol monobutyl ether), and a mixture of polyethylene glycol monoether compounds wherein n is from 4 to 6 in the general formula (III), such as a mixture of tetraethylene glycol monomethyl ether, pentaethylene glycol monomethyl ether and hexaethylene glycol monomethyl ether.

The oil-based ink composition of the invention can further contain other organic solvents as the organic solvent, in addition to the diethylene glycol compound, the dipropylene glycol compound, the lactone and optionally the polyethylene glycol monoether compound.

Examples of the other organic solvent that can preferably be used include polar organic solvents such as alcohols (such as methyl alcohol, ethyl alcohol, propyl alcohol, butyl alcohol or fluorinated alcohol), ketones (such as acetone, methyl ethyl ketone or cyclohexanone), carboxylic acid esters (such as methyl acetate, ethyl acetate, propyl acetate, butyl acetate, methyl propionate or ethyl propionate), and ethers (such as diethyl ether, dipropyl ether, tetrahydrofuran or dioxane).

Where the oil-based ink composition of the invention contains at least any one of the diethylene glycol compound, dipropylene glycol compound and the lactone, and does not contain the polyethylene glycol monoether compound, the sum of the diethylene glycol compound, dipropylene glycol compound and the lactone is preferably 75% by weight or more of the whole organic solvent component.

Where the oil-based ink composition of the invention contains the polyethylene glycol monoether compound in addition to the diethylene glycol compound, the dipropylene glycol compound and the lactone, the sum of the diethylene glycol compound, the dipropylene glycol compound, the lactone and the polyethylene glycol monoether compound is preferably 80% by weight or more of the whole organic solvent component.

The oil-based ink composition of the invention preferably contains a polyoxyethylene derivative which is a silicone surfactant or a nonionic surfactant, other than the coloring material and the organic solvent.

The silicone surfactant that is preferably used is a polyester-modified silicone or a polyether-modified silicone, and specific examples thereof include BYK-347, BYK-348, and BYK-UV 3500, 3510, 3530 and 3570 (all products of BYK-Chemie Japan). The polyoxyethylene derivative can use an acetylene glycol surfactant, and specific examples thereof include SURFINOL 104, 82, 465, 485 AND TG (all trade names of Air Products and Chemicals, Inc.), and OLFINE STG and OLFINE E1010 (all trade names of Nisshin Chemical Industry Co., Ltd.). Other commercially available products include NISSAN NONION A-10R and A-13R (products of NOF Corporation), FLORENE TG-740W and D-90 (products of Kyoeisha Chemical Co., Ltd.) and NOYGEN CX-100 (a product of Dai-Ichi Kogyo Seiyaku Co., Ltd.).

The polyoxyethylene derivative is preferably a compound which is liquid at ordinary temperature under ordinary pressure. Examples of the polyoxyethylene derivative include polyoxyethylene alkyl ethers such as a polyoxyethylene cetyl ether (such as NISSAN NONION P-208, a product of NOF Corporation), a polyixyethylene oleyl ether (such as NISSAN NONION E-202S and E-205S, products of NOF Corporation) or a polyoxyethylene lauryl ether (such as EMULGEN 106 and 108, products of Kao Corporation); polyoxyethylene alkyl phenol ethers such as a polyoxyethylene octyl phenol ether (such as NISSAN NONION HS-204.5, HS-206 and HS-208, products of NOF Corporation); sorbitan monoesters such as a sorbitan monocaprylate (such as NISSAN NONION CP-08R, a product of NOF Corporation) or a sorbitan monolaurate (such as NISSAN NONION LP-20R, a product of NOF Corporation); polyoxyethylene sorbitan monoesters such as a polyoxyethylene sorbitan monostearate (such as NISSAN NONION OT-221, a product of NOF Corporation); polycarboxylic acid polymeric activators (FLORENE G-700, a product of Kyoeisha Chemical Co., Ltd.); polyoxyethylene higher polymeric activators (such as EMULGEN 707 and 709, products of Kao Corporation); tetraglycerin oleates (such as POEM J-4581, Riken Vitamin Co., Ltd.); nonyl phenol ethoxyates (such as ADECATOL NP-620, NP-650, NO-660, NP-675, NP-683 and NP-686, products of ADEKA Corporation); aliphatic phosphoric acid esters (such as ADECATOL CS-141E and TS-230E, products of ADEKA Corporation); sorbitan sesquioleates (such as SOLGEN 30, a product of Dai-Ichi Kogyo Seiyaku Co., Ltd.); sorbitan monooleates (such as SOLGEN 40, a product of Dai-Ichi Kogyo Seiyaku Co., Ltd.); polyethylene glycol sorbitan monolaurates (such as SOLGEN TW-20, a product of Dai-Ichi Kogyo Seiyaku Co., Ltd.); and polyethylene glycol sorbitan monooleates (such as SOLGEN TW-80, a product of Dai-Ichi Kogyo Seiyaku Co., Ltd.). Furthermore, an acetylene glycol surfactant can be used as the polyoxyethylene derivative. The specific example of the preferred acetylene glycol surfactant includes a compound represented by the following general formula (IV).

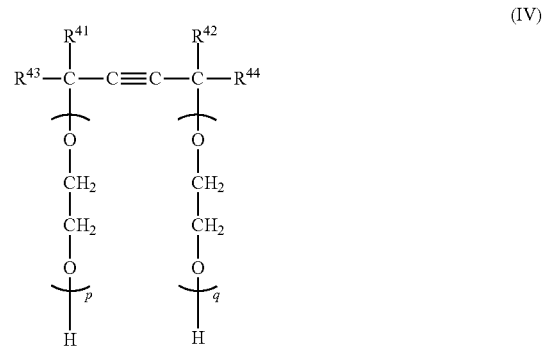

wherein 0≦p+q≦50, and $R^{41}$, $R^{42}$ and $R^{43}$ each independently represent an alkyl group, and preferably an alkyl group having from 1 to 6 carbon atoms.

Of the compounds represented by the above general formula (IV), particularly preferred compounds include 2,4,7,9-tetramethyl-5-desine-4,7-diol, 3,6-dimethyl-4-octine-3,6-diol and 3,5-dimethyl-1-hexine-3-ol. Commercially available products can be used as the acetylene glycol surfactant represented by the general formula (IV), and specific examples thereof include SURFINOL 104, 82, 465, 485 and TG (all available from Air Products and Chemicals, Inc.), and OLFINE STG and OLFINE E1010 (all trade names of Nisshin Chemical Industry Co., Ltd.).

The polyoxyethylene derivative can use other commercially available products, and specific examples thereof include NISSAN NONION A-10R and A-13R (products of NOF Corporation), FLORENE TG-740W and D-90 (products of Kyoeisha Chemical Co., Ltd.), EMULGEN A-90 and A-60 (products of Kao Corporation) and NOYGEN CX-100 (a product of Dai-Ichi Kogyo Seiyaku Co., Ltd.).

In the oil-based ink composition of the invention, the content of the polyoxyethylene derivative can appropriately be selected according to resolubility to be imparted, but is preferably from 5 to 200 parts by weight, and more preferably from 30 to 120 parts by weight, per 100 parts by weight of the content of the coloring material (particularly, pigment) in the ink composition.

The oil-based ink composition of the invention can contain a dispersant. The dispersant can use optional dispersants that are used in general oil-based ink compositions, particularly oil-based ink compositions for ink-jet recording. In particular, it is preferred to use a dispersant which effectively acts when a solubility parameter of an organic solvent is from 8 to 11. Such a dispersant can use commercially available products, and specific examples thereof include polyester-type polymer compounds (HINOACT KF1-M, T-6000, T-7000, T-8000, T-8350P and T-8000E, products of Takefu Fine Chemicals Co., Ltd.); SOLSPERSE 20000, 24000, 32000, 32500, 33500, 34000 and 35200 (products of Avecia Limited); DISPER BYK-161, 162, 163, 164, 166, 180, 190, 191 and 192 (products of BYK-Chemie, Japan); FLORENE DOPA-17, 22 and 33, and G-700 (products of Kyoeisha Chemical Co., Ltd.); AJISPER PB-821 and PB-711 (products of Ajinomoto Co., Inc.); and LP4010, LP4050, LP4055, and POLYMER 400, 401, 402, 403, 450, 451 and 453 (products of EFKA Chemicals).

In the oil-based ink composition of the invention, the content of the dispersant can appropriately be selected depending on the coloring material to be dispersed, but is preferably 5 to 200 parts by weight, and more preferably from 30 to 120 parts by weight, per 100 parts by weight of the content of the coloring material (particularly, pigment) in the ink composition.

The oil-based ink composition of the invention can contain other additives contained in general oil-based ink compositions, in addition to the above-described coloring material and organic solvent. One example of such additives includes a stabilizer (for example, an antioxidant or an ultraviolet absorber). Examples of the antioxidant that can be used include BHA (2,3-butyl-4-oxyanisole) and BHT (2,6-di-t-butyl-p-cresol), and examples of the ultraviolet absorber that can be used include a benzophenone compound and a benzotriazole compound.

Viscosity of the oil-based ink composition of the invention can be adjusted by a binder resin. The viscosity (viscosity at a temperature of 20° C.) of the oil-based ink composition of the invention is, for example, 10 mPa·s, and preferably 5 mpa·s. Examples of the binder resin that can be used include an acryl resin, a styrene acryl resin, a rosin-modified resin, a phenolic resin, a terpene resin, a polyester resin, a polyamide resin, an epoxy resin, a vinyl chloride-vinyl acetate copolymer, a cellulose resin (such as cellulose acetate butyrate), and a vinyl toluene-α-methylstyrene copolymer. The binder resin can act to further improve fixability of the coloring material to a recording medium according to the addition amount thereof.

The oil-based ink composition of the invention can be prepared by the conventional methods. When a pigment is used as the coloring material, the oil-based pigment ink composition can be obtained as follows. A pigment, a dispersant and a mixture (a part) of the above-described diethylene glycol compound and the above-described dipropylene glycol compound are mixed, and a pigment dispersion is prepared using a ball mill, a bead mill, ultrasonic wave or a jet mill, followed by adjusting to have the desired ink properties. Subsequently, a binder resin, a mixture (remainder) of the above-described diethylene glycol compound and the above-described dipropylene glycol compound, and other additives (such as a dispersing agent or a viscosity regulator) are added under stirring, thereby obtaining an oil-based pigment ink composition. Alternatively, a pigment and a dye are used together as the coloring material, and an oil-based ink composition can be prepared by the same method as in the preparation method of the above oil-based pigment ink composition.

Properties of the oil-based ink composition of the invention are not particularly limited. However, for example, the oil-based ink composition has surface tension of preferably from 20 to 50 mN/m. Where the surface tension is less than 20 mN/m, the ink composition wet-expands on the surface of a printer head for ink-jet recording, or oozes thereon, and it may be difficult to discharge ink droplets. Where the surface tension exceeds 50 mN/m, the ink composition does not wet-expand on the surface of a recording medium, and good printing may not be conducted.

The oil-based ink composition of the invention has the advantage that the ink composition is inert to a discharge nozzle surface having been subjected to waste ink treatment. Therefore, the oil-based ink composition of the invention can advantageously be used to an ink-jet recording method that discharges an ink from a printer head for ink-jet recording having a discharge nozzle surface having been subjected to waste ink treatment. Furthermore, the oil-based ink composition of the invention can prevent disadvantages in the case of using the conventional oil-based ink to a waste ink-treated head, specifically a phenomenon that an ink wet-expands on the waste ink-treated head, a phenomenon that ink discharging is unstable or a phenomenon that an ink corrodes a head.

The oil-based ink composition of the invention is preferably used even in utilization to an ink-jet recording head in which waste ink treatment has been subjected to a surface layer portion of a nozzle plate. By the combination of the oil-based ink composition of the invention and an ink-jet recording head to which waste ink treatment has been subjected, flight deflection of an ink is difficult to be generated, and good image can be recorded on a recording paper. According to the oil-based ink composition, surface state of a nozzle plate to which waste ink treatment has been subjected can be maintained in good state over a long period of time, and a long-term ink discharge stability can be realized.

The oil-based ink composition of the invention can be applied to various ink-jet recording methods. Specifically, the oil-based ink composition can be applied to various ink-jet recording methods such as an electric-field controlling method in which an ink is discharged utilizing electrostatic attracting force, a drop-on-demand method (or pressure pulse method) in which an ink is discharged utilizing driving pressure of a piezoelectric element, and a bubble or thermal jet method in which an ink is discharged by utilizing pressure caused by forming gas bubbles by high heat and growing the same. However, the oil-based ink composition of the invention is preferably applied to the drop-on-demand method in which an ink is discharged utilizing driving pressure of a piezoelectric element, and when printing is performed by this method, discharge stability is excellent, high definition image free of color oozing and color bleeding can be obtained, and additionally, wear resistance and water resistance are excellent.

Furthermore, when the oil-based ink composition of the invention is used, an excellent image can be formed on a large-sized recoding medium of, for example, about A0 size by a large-sized ink-jet recording device.

EXAMPLES

The present invention will be described in greater detail by reference to the following Examples, but the invention should not be construed as being limited thereto.

Each color ink composition of the following Examples (1-1) to (1-5) and Comparative Example (1-1) to (1-3), and each color ink composition in color ink sets of Examples (1-6) to (1-9) were prepared as follows.

Preparation of pigment dispersion and preparation of color ink composition:

A mixture comprising 15 parts by weight of pigments shown below, 9 parts by weight of a dispersant (FLORENE DOPA-33, a product of Kyoeisha Chemical Co., Ltd.), and the remaining amount of diethylene glycol diethyl ether was mixed and stirred for 1 hour using a dissolver, followed by conducting preliminary dispersion with a sand mill having zirconia beads having a diameter of 2 mm filled therein. The preliminary dispersion was conducted until an average particle size of pigment particles was 5 μm or less. Subsequently, a pigment dispersion was separated with a separator, and dispersion treatment was conducted using a sand mill having zirconia beads having a diameter of 0.3 mm filled therein until the average particle size of the pigment particles was 200 nm or less.

Pigment:
 Pigment 1: C.I. Pigment Black 7
 Pigment 2: C.I. Pigment Yellow 155
 Pigment 3: C.I. Pigment Violet 19
 Pigment 4: C.I. Pigment Blue 15:3
 Pigment 5: C.I. Pigment Yellow 213

Using the pigment dispersion obtained, the following ink composition was prepared.

Diethylene glycol diethyl ether, dipropylene glycol monomethyl ether, γ-butyrolactone, tetraethylene glycol dimethyl ether and a surfactant (BYK-UV3570, a product of BYK-Chemie, Japan), in amounts corresponding to the following wt % were introduced into a container, and mixed and stirred for 30 minutes using a magnetic stirrer to completely dissolve. A fixing resin (polyacryl polyol-type fixing resin: N-2043-AF-1 or N-2043-60MEX, a product of Harima Chemicals, Inc., polyurethane-type fixing resin: SANPRENE IB-501, a product of Sanyo Chemical Industries, Ltd., or vinyl chloride-vinyl acetate copolymer) were added to the container, followed by mixing and stirring for 30 minutes. The pigment dispersion obtained above was added to the container, followed by mixing and stirring for 1 hour. The resulting mixture was filtered using a 5 μm PTFE-made membrane filter to obtain each color ink composition.

Examples (1-1) to (1-5) and Comparative Examples (1-1) to (1-3)

Example (1-1): Black Ink Composition 1

| | |
|---|---|
| C.I. Pigment Black 7 | 5 wt % |
| Dispersant (FLORENE DOPA-33) | 3 wt % |
| Diethylene glycol diethyl ether | 52.1 wt % |
| Dipropylene glycol monomethyl ether | 34.7 wt % |
| Surfactant | 0.2 wt % |
| (BYK-UV3570, a product of BYK-Chemie, Japan) | |
| Polyacryl polyol-type fixing resin | 5 wt % |
| (N-2043-AF-1, a product of Harima Chemicals, Inc.) | |

Example (1-2): Black Ink Composition 2

| | |
|---|---|
| C.I. Pigment Black 7 | 5 wt % |
| Dispersant (FLORENE DOPA-33) | 3 wt % |
| Diethylene glycol diethyl ether | 50.6 wt % |
| Dipropylene glycol monomethyl ether | 33.7 wt % |
| Surfactant | 0.2 wt % |
| (BYK-UV3570, a product of BYK-Chemie, Japan) | |
| Polyurethane-type fixing resin | 7.5 wt % |
| (SANPRENE IB-F370, a product of Sanyo Chemical Industries, Ltd.) | |

Example (1-3): Black Ink Composition 3

| | |
|---|---|
| C.I. Pigment Black 7 | 5 wt % |
| Dispersant (FLORENE DOPA-33) | 3 wt % |
| Diethylene glycol diethyl ether | 49.1 wt % |
| Dipropylene glycol monomethyl ether | 32.7 wt % |
| Surfactant | 0.2 wt % |
| (BYK-UV3570, a product of BYK-Chemie, Japan) | |
| Polyurethane-type fixing resin | 10 wt % |
| (SANPRENE IB-F501, a product of Sanyo Chemical Industries, Ltd.) | |

Comparative Example (1-1): Black Ink Composition 4

| | |
|---|---|
| C.I. Pigment Black 7 | 5 wt % |
| Dispersant (FLORENE DOPA-33) | 3 wt % |
| Diethylene glycol diethyl ether | 53.3 wt % |
| Dipropylene glycol monomethyl ether | 35.5 wt % |
| Surfactant | 0.2 wt % |
| (BYK-UV3570, a product of BYK-Chemie, Japan) | |
| Fixing resin | 3 wt % |
| (Vinyl chloride-vinyl acetate copolymer) | |

Comparative Example (1-2): Black Ink Composition 5

| | |
|---|---|
| C.I. Pigment Black 7 | 5 wt % |
| Dispersant (FLORENE DOPA-33) | 3 wt % |
| Diethylene glycol diethyl ether | 52.1 wt % |
| Dipropylene glycol monomethyl ether | 34.7 wt % |
| Surfactant | 0.2 wt % |
| (BYK-UV3570, a product of BYK-Chemie, Japan) | |
| Ion-exchanged water | 5 wt % |

Comparative Example (1-3): Black Ink Composition 6

| | |
|---|---|
| C.I. Pigment Black 7 | 5 wt % |
| Dispersant (FLORENE DOPA-33) | 3 wt % |
| Diethylene glycol diethyl ether | 55.1 wt % |
| Dipropylene glycol monomethyl ether | 36.7 wt % |
| Surfactant | 0.2 wt % |
| (BYK-UV3570, a product of BYK-Chemie, Japan) | |

Example (1-4): Black Ink Composition 7

| | |
|---|---|
| C.I. Pigment Black 7 | 5 wt % |
| Dispersant (FLORENE DOPA-33) | 3 wt % |
| Diethylene glycol diethyl ether | 52.1 wt % |
| Dipropylene glycol monomethyl ether | 34.7 wt % |
| Surfactant | 0.2 wt % |
| (BYK-UV3570, a product of BYK-Chemie, Japan) | |
| Polyacryl polyol-type fixing resin | 5 wt % |
| (N-2043-60MEX, a product of Harima Chemicals, Inc.) | |

Example (1-5): Black Ink Composition 8

| | |
|---|---|
| C.I. Pigment Black 7 | 5 wt % |
| Dispersant (FLORENE DOPA-33) | 3 wt % |
| Diethylene glycol diethyl ether | 53.8 wt % |
| γ-Butyrolactone | 15 wt % |
| Tetraethylene glycol dimethyl ether | 18 wt % |
| Surfactant | 0.2 wt % |
| (BYK-UV3570, a product of BYK-Chemie, Japan) | |
| Polyacryl polyol-type fixing resin | 5 wt % |
| (N-2043-60MEX, a product of Harima Chemicals, Inc.) | |

The following "printing evaluation 1" was conducted on Black Ink Compositions 1 to 3, 7 and 8 of Examples (1-1) to (1-5) above and Black Ink Compositions 4 to 6 of Comparative Examples (1-1) to (1-3) above.

Printing Evaluation 1:

Using ink-jet printer SJ-540, a product of Roland D. G., Black Ink Compositions 1 to 8 were charged in the respective black lines, and solid image printing was conducted at a heating temperature of 50° C. Recording media used were a vinyl chloride sheet (Viewcal 900 (white), a product of Sakurai Co., Ltd.), an olefin sheet (Viewcal 2000 (white), a product of Sakurai Co., Ltd.), a PET film (PG-50L, a product of Lami Corporation Inc.), and a polycarbonate film (YUPIRON, a product of Mitsubishi Engineering-Plastics Corporation), all cut to an A4 size. The evaluation results of fixability based on the following evaluation index are shown in Table 1.

Fixability Evaluation Index

Tape Peel Test:

AA: Peeling is not generated at the interface between a cured coating and a film.

A: A part of an edge part of a cured coating adheres to a pressure-sensitive adhesive layer of a tape and peeled, but it is a practical level.

B: Peeling is generated at the interface between a cured coating and a film, large part of a cured coating adheres to a pressure-sensitive adhesive layer of a tape, and it is not a practical level.

C: Peeling is generated at the interface between a cured coating and a film, and the whole cured coating adheres to a tape and peeled.

TABLE 1

| | | Evaluation Result | | | |
|---|---|---|---|---|---|
| | Ink composition | Viewcal 900 | Viewcal 2000 | PG-50L | FE-2000 |
| Example (1-1) | Black Ink Composition 1 | AA | AA | AA | AA |
| Example (1-2) | Black Ink Composition 2 | AA | AA | A | A |
| Example (1-3) | Black Ink Composition 3 | AA | AA | A | A |
| Example (1-4) | Black Ink Composition 7 | AA | AA | AA | AA |
| Example (1-5) | Black Ink Composition 8 | AA | AA | AA | AA |
| Comparative Example (1-1) | Black Ink Composition 4 | A | A | B | B |
| Comparative Example (1-2) | Black Ink Composition 5 | A | A | C | C |
| Comparative Example (1-3) | Black Ink Composition 6 | A | A | C | C |

As is apparent from Table 1, a good printed matter having good fixability is obtained with the oil-based ink composition of the invention using an alkylene glycol compound as an organic solvent and having a resin emulsion added thereto.

Example (1-6)

Using the following color ink set (ink set comprising Yellow Ink Composition 1, Magenta Ink Composition 1 or Cyan Ink Composition 1), full color image printing was carried out, and the following "printing evaluation 2" was conducted.

Yellow Ink Composition 1:

| | |
|---|---|
| C.I. Pigment Yellow 155 | 5 wt % |
| Dispersant (FLORENE DOPA-33) | 3 wt % |
| Diethylene glycol diethyl ether | 52.1 wt % |
| Dipropylene glycol monomethyl ether | 34.7 wt % |
| Surfactant | 0.2 wt % |
| (BYK-UV3570, a product of BYK-Chemie, Japan) | |
| Polyacryl polyol-type fixing resin | 5 wt % |
| (N-2043-AF-1, a product of Harima Chemicals, Inc.) | |

Magenta Ink Composition 1:

| | |
|---|---|
| C.I. Pigment Violet 19 | 5 wt % |
| Dispersant (FLORENE DOPA-33) | 3 wt % |
| Diethylene glycol diethyl ether | 52.1 wt % |
| Dipropylene glycol monomethyl ether | 34.7 wt % |
| Surfactant | 0.2 wt % |
| (BYK-UV3570, a product of BYK-Chemie, Japan) | |
| Polyacryl polyol-type fixing resin | 5 wt % |
| (N-2043-AF-1, a product of Harima Chemicals, Inc.) | |

Cyan Ink Composition 1:

| | |
|---|---|
| C.I. Pigment Blue 15:3 | 5 wt % |
| Dispersant (FLORENE DOPA-33) | 3 wt % |
| Diethylene glycol diethyl ether | 52.1 wt % |
| Dipropylene glycol monomethyl ether | 34.7 wt % |
| Surfactant | 0.2 wt % |
| (BYK-UV3570, a product of BYK-Chemie, Japan) | |
| Polyacryl polyol-type fixing resin | 5 wt % |
| (N-2043-AF-1, a product of Harima Chemicals, Inc.) | |

Example (1-7)

Using the following color ink set (ink set comprising Black Ink Composition 9, Yellow Ink Composition 2, Magenta Ink Composition 2 or Cyan Ink Composition 2), full color image printing was carried out, and the following "printing evaluation 2" was conducted.

Black Ink Composition 9:

| | |
|---|---|
| C.I. Pigment Black 7 | 5 wt % |
| Dispersant (FLORENE DOPA-33) | 3 wt % |
| Diethylene glycol diethyl ether | 58.2 wt % |
| γ-Butyrolactone | 13 wt % |
| Tetraethylene glycol dimethyl ether | 15.6 wt % |
| Surfactant | 0.2 wt % |
| (BYK-UV3570, a product of BYK-Chemie, Japan) | |
| Polyacryl polyol-type fixing resin | 5 wt % |
| (N-2043-AF-1, a product of Harima Chemicals, Inc.) | |

Yellow Ink Composition 2:

| | |
|---|---|
| C.I. Pigment Yellow 155 | 5 wt % |
| Dispersant (FLORENE DOPA-33) | 3 wt % |
| Diethylene glycol diethyl ether | 58.3 wt % |
| γ-Butyrolactone | 13 wt % |
| Tetraethylene glycol dimethyl ether | 15.7 wt % |
| Polyacryl polyol-type fixing resin | 5 wt % |
| (N-2043-AF-1, a product of Harima Chemicals, Inc.) | |

Magenta Ink Composition 2:

| | |
|---|---|
| C.I. Pigment Violet 19 | 5 wt % |
| Dispersant (FLORENE DOPA-33) | 3 wt % |
| Diethylene glycol diethyl ether | 58.3 wt % |
| γ-Butyrolactone | 13 wt % |
| Tetraethylene glycol dimethyl ether | 15.7 wt % |
| Polyacryl polyol-type fixing resin | 5 wt % |
| (N-2043-AF-1, a product of Harima Chemicals, Inc.) | |

Cyan Ink Composition 2:

| | |
|---|---|
| C.I. Pigment Blue 15:3 | 5 wt % |
| Dispersant (FLORENE DOPA-33) | 3 wt % |
| Diethylene glycol diethyl ether | 58.3 wt % |
| γ-Butyrolactone | 13 wt % |
| Tetraethylene glycol dimethyl ether | 15.7 wt % |
| Polyacryl polyol-type fixing resin | 5 wt % |
| (N-2043-AF-1, a product of Harima Chemicals, Inc.) | |

Example (1-8)

Using the following color ink set (ink set comprising Black Ink Composition 9, Yellow Ink Composition 3, Magenta Ink Composition 3 or Cyan Ink Composition 3), full color image printing was carried out, and the following "printing evaluation 2" was conducted.

Black Ink Composition 9:

| | |
|---|---|
| C.I. Pigment Black 7 | 5 wt % |
| Dispersant (FLORENE DOPA-33) | 3 wt % |
| Diethylene glycol diethyl ether | 58.2 wt % |
| γ-Butyrolactone | 13 wt % |
| Tetraethylene glycol dimethyl ether | 15.6 wt % |
| Surfactant | 0.2 wt % |
| (BYK-UV3570, a product of BYK-Chemie, Japan) | |
| Polyacryl polyol-type fixing resin | 5 wt % |
| (N-2043-AF-1, a product of Harima Chemicals, Inc.) | |

Yellow Ink Composition 3:

| | |
|---|---|
| C.I. Pigment Yellow 155 | 5 wt % |
| Dispersant (FLORENE DOPA-33) | 3 wt % |
| Diethylene glycol diethyl ether | 58.2 wt % |
| γ-Butyrolactone | 13 wt % |
| Tetraethylene glycol dimethyl ether | 15.6 wt % |
| Surfactant | 0.2 wt % |
| (BYK-UV3570, a product of BYK-Chemie, Japan) | |
| Polyacryl polyol-type fixing resin | 5 wt % |
| (N-2043-AF-1, a product of Harima Chemicals, Inc.) | |

Magenta Ink Composition 3:

| | |
|---|---|
| C.I. Pigment Violet 19 | 5 wt % |
| Dispersant (FLORENE DOPA-33) | 3 wt % |
| Diethylene glycol diethyl ether | 58.2 wt % |
| γ-Butyrolactone | 13 wt % |
| Tetraethylene glycol dimethyl ether | 15.6 wt % |
| Surfactant | 0.2 wt % |
| (BYK-UV3570, a product of BYK-Chemie, Japan) | |
| Polyacryl polyol-type fixing resin | 5 wt % |
| (N-2043-AF-1, a product of Harima Chemicals, Inc.) | |

Cyan Ink Composition 3:

| | |
|---|---|
| C.I. Pigment Blue 15:3 | 5 wt % |
| Dispersant (FLORENE DOPA-33) | 3 wt % |
| Diethylene glycol diethyl ether | 58.2 wt % |
| γ-Butyrolactone | 13 wt % |
| Tetraethylene glycol dimethyl ether | 15.6 wt % |
| Surfactant (BYK-UV3570, a product of BYK-Chemie, Japan) | 0.2 wt % |
| Polyacryl polyol-type fixing resin (N-2043-AF-1, a product of Harima Chemicals, Inc.) | 5 wt % |

Example (1-9)

Using the following color ink set (ink set comprising Black Ink Composition 10, Yellow Ink Composition 4, Magenta Ink Composition 4 or Cyan Ink Composition 4), full color image printing was carried out, and the following "printing evaluation 2" was conducted.

Black Ink Composition 10:

| | |
|---|---|
| C.I. Pigment Black 7 | 5 wt % |
| Dispersant (FLORENE DOPA-33) | 3 wt % |
| Diethylene glycol diethyl ether | 58.2 wt % |
| γ-Butyrolactone | 13 wt % |
| Tetraethylene glycol dimethyl ether | 15.6 wt % |
| Surfactant (BYK-UV3570, a product of BYK-Chemie, Japan) | 0.2 wt % |
| Polyacryl polyol-type fixing resin (N-2043-60MEX, a product of Harima Chemicals, Inc.) | 5 wt % |

Yellow Ink Composition 4:

| | |
|---|---|
| C.I. Pigment Yellow 213 | 5 wt % |
| Dispersant (FLORENE DOPA-33) | 3 wt % |
| Diethylene glycol diethyl ether | 58.2 wt % |
| γ-Butyrolactone | 13 wt % |
| Tetraethylene glycol dimethyl ether | 15.6 wt % |
| Surfactant (BYK-UV3570, a product of BYK-Chemie, Japan) | 0.2 wt % |
| Polyacryl polyol-type fixing resin (N-2043-60MEX, a product of Harima Chemicals, Inc.) | 5 wt % |

Magenta Ink Composition 4:

| | |
|---|---|
| C.I. Pigment Violet 19 | 5 wt % |
| Dispersant (FLORENE DOPA-33) | 3 wt % |
| Diethylene glycol diethyl ether | 58.2 wt % |
| γ-Butyrolactone | 13 wt % |
| Tetraethylene glycol dimethyl ether | 15.6 wt % |
| Surfactant (BYK-UV3570, a product of BYK-Chemie, Japan) | 0.2 wt % |
| Polyacryl polyol-type fixing resin (N-2043-60MEX, a product of Harima Chemicals, Inc.) | 5 wt % |

Cyan Ink Composition 4:

| | |
|---|---|
| C.I. Pigment Blue 15:3 | 5 wt % |
| Dispersant (FLORENE DOPA-33) | 3 wt % |
| Diethylene glycol diethyl ether | 58.2 wt % |
| γ-Butyrolactone | 13 wt % |
| Tetraethylene glycol dimethyl ether | 15.6 wt % |
| Surfactant (BYK-UV3570, a product of BYK-Chemie, Japan) | 0.2 wt % |
| Polyacryl polyol-type fixing resin (N-2043-60MEX, a product of Harima Chemicals, Inc.) | 5 wt % |

Printing Evaluation 2:

A color ink set comprising each ink composition (Examples (1-6) to (1-9)) was used. Using an ink-jet printer EM-930C, a product of Seiko Epson Corporation, each ink composition was charged in the respective corresponding color line, and full color image printing was carried out at ordinary temperature under ordinary pressure. The recording medium used was a vinyl chloride sheet cut to A4 size (Viewcal 2000 (white), a product of Sakurai Co., Ltd.). After printing, a printed matter was dried at ordinary temperature overnight.

As a result of the printing evaluation 2, high image quality and high definition full color image having excellent fixability was obtained.

Examples (2-1) to (2-5) and Comparative Examples (2-1) and (2-2)

Each white ink composition of the following Examples (2-1) to (2-5) and Comparative Examples (2-1) and (2-2) was prepared as follows.

Preparation of Hollow Resin Emulsion 1:

(1) Polymer Particle 1

100 parts by weight of styrene, 1 part by weight of α-methylstyrene dimer, 14 parts by weight of t-dodecylmercaptane, 0.8 part by weight of sodium dodecylbenzene sulfonate, 1.0 part by weight of potassium persulfate and 200 parts by weight of water were placed in a 2 liters reaction vessel, stirred in nitrogen gas, and heated to 80° C. to conduct emulsion polymerization for 6 hours. Polymer Particle 1 thus obtained had an average particle size of 250 nm.

(2) Hollow Resin Emulsion 1

10 parts by weight (in terms of solid content) of Polymer Particle 1 obtained in (1) above, 0.3 part by weight of sodium laurylsulfate, 0.5 part by weight of potassium persulfate and 400 parts by weight of water were placed in a reaction vessel. A crosslinking polymerizable monomer composition comprising a mixture of 11.6 parts by weight of divinylbenzene (purity 55% by weight; the remainder is a monofunctional vinyl monomer), 8.4 parts by weight of ethyl vinylbenzene, 5 parts by weight of methacrylic acid and 75 parts by weight of methyl methacrylate were added to the reaction vessel. The resulting mixture was stirred at 30° C. for 1 hour and further stirred at 70° C. for 5 hours to conduct emulsion polymerization treatment, thereby obtaining an aqueous dispersion. As a result of measuring the dispersion obtained with a particle size analyzer (Microtrack UPA: a product of Nikkiso Co., Ltd.), the particle size was 520 nm. Separately, as a result of observing the dispersion with a transmission electron microscope, it was confirmed to be hollow resin fine particles. The emulsion thus obtained is called Hollow Resin Emulsion 1.

Preparation of Diethylene Glycol Diethyl Ether Dispersion A of Hollow Resin Emulsion 1:

The Hollow Resin Emulsion 1 obtained was separated from water by centrifugal separation method, and then dried at 40° C. under reduced pressure for 3 days to further remove water. The Hollow Resin Emulsion 1 obtained was weighed to a round-bottom flask, diethylene glycol diethyl ether was added to the flask such that a solid content concentration was 20 wt %, and the resulting mixture was stirred using a magnetic stirrer for 24 hours. Subsequently, the round-bottom flask containing a diethylene glycol diethyl ether dispersion of Hollow Resin Emulsion 1 was placed in an ultrasonic cleaning tank, and vacuum devolatilization treatment was carried out with an aspirator for 8 hours while conducting ultrasonic dispersion, thereby completely substituting air in the Hollow Resin Emulsion 1 with diethylene glycol diethyl ether. The dispersion obtained is called diethylene glycol diethyl ether dispersion A of the Hollow Resin Emulsion 1.

Preparation of White Ink Composition 1 (Example (2-1))

Using the diethylene glycol diethyl ether dispersion A of the Hollow Resin Emulsion 1, White Ink Composition 1 having the following composition was prepared.

Dipropylene glycol monomethyl ether and a surfactant were dispensed in a vessel, and sufficiently mixed with a magnetic stirrer for 30 minutes. The resin emulsion N-2043-AF-1 was added to the vessel, and the resulting mixture was similarly stirred for 30 minutes to sufficiently mix. The dispersion A was added to the vessel, followed by stirring and mixing for 1 hour. A product obtained was filtered with a 10 µm PTFE-made membrane filter to obtain White Ink Composition 1 (Example (2-1)).

White Ink Composition 1: Example (2-1)

| | |
|---|---|
| Hollow Resin Emulsion 1 | 15 wt % |
| Diethylene glycol diethyl ether | 60.0 wt % |
| Dipropylene glycol monomethyl ether | 20.8 wt % |
| Surfactant (BYK-UV3500, a product of BYK-Chemie, Japan) | 0.2 wt % |
| Polyacryl polyol-type resin emulsion (N-2043-AF-1, a product of Harima Chemicals, Inc.) | 4.0 wt % |

The following White Ink Compositions 2 to 5 (Examples (2-2) to (2-5)) and White Ink Compositions 4 and 5 (Comparative Examples (2-1) and (2-2)) were prepared in the same manner as in the White Ink Composition 1 (Example (2-1)).

White Ink Composition 2: Example (2-2)

| | |
|---|---|
| Hollow Resin Emulsion 1 | 15 wt % |
| Diethylene glycol diethyl ether | 60.0 wt % |
| γ-Butyrolactone | 11 wt % |
| Tetraethylene glycol dimethyl ether | 10.8 wt % |
| Surfactant (BYK-UV3500, a product of BYK-Chemie, Japan) | 0.2 wt % |
| Polyacryl polyol-type resin emulsion (N-2043-AF-1, a product of Harima Chemicals, Inc.) | 3.0 wt % |

White Ink Composition 3: Example (2-3)

| | |
|---|---|
| Hollow Resin Emulsion 1 | 15 wt % |
| Diethylene glycol diethyl ether | 60.0 wt % |
| γ-Butyrolactone | 10 wt % |
| Tetraethylene glycol dimethyl ether | 9.8 wt % |
| Surfactant (BYK-UV3500, a product of BYK-Chemie, Japan) | 0.2 wt % |
| Resin emulsion (SANPRENE IB-F370, a product of Sanyo Chemical Industries, Ltd.) | 3.0 wt % |

White Ink Composition 4: Comparative Example (2-1)

| | |
|---|---|
| Hollow Resin Emulsion 1 | 15 wt % |
| Diethylene glycol diethyl ether | 62 wt % |
| γ-Butyrolactone | 11.5 wt % |
| Tetraethylene glycol dimethyl ether | 11.3 wt % |
| Surfactant (BYK-UV3500, a product of BYK-Chemie, Japan) | 0.2 wt % |

White Ink Composition 5: Comparative Example (2-2)

| | |
|---|---|
| Hollow Resin Emulsion 1 | 15 wt % |
| Diethylene glycol diethyl ether | 62 wt % |
| γ-Butyrolactone | 10.5 wt % |
| Tetraethylene glycol dimethyl ether | 10.3 wt % |
| Surfactant (BYK-UV3500, a product of BYK-Chemie, Japan) | 0.2 wt % |
| Resin (Cellulose acetate butyrate, degree of butylation: 50 to 54%, a product of Kanto Chemical Co., Inc.) | 2.0 wt % |

Comparative Examples (2-3) and (2-4) and Reference Example

Each white ink composition of the following Comparative Examples (2-3) and (2-4) and Reference Example was prepared as follows.

Preparation of Titanium Dioxide Fine Particles

Titanium-containing ore was dissolved with sulfuric acid to obtain a titanium sulfate solution. The titanium sulfate solution was hydrolyzed to obtain aqueous titanium oxide. 0.50 part by weight of ammonium phosphate, 0.30 part by weight of potassium sulfate and 0.30 part by weight of aluminum sulfate were added to 100 parts of the aqueous titanium oxide in terms of $TiO_2$. The aqueous titanium oxide was heated in a laboratory rotating muffle furnace until a product temperature reached 1,020° C. Titanium dioxide fine particles formed were cooled to room temperature, and observed with a transmission electron microphotograph. As a result, it was found that the fine particles are anatase type particles having an average primary particle size of 0.13 µm. 15 parts by weight of the titanium dioxide fine particles as a surface-treated white pigment, 5 parts by weight of a polyoxyalkylene-added polyalkylene amine (DISCOL N-518, a product of Dai-Ichi Kogyo Seiyaku Co., Ltd.) as a dispersant, and 80 parts by weight of diethylene glycol diethyl ether were mixed to obtain a slurry. Zirconia beads (1.0 mm diameter) in an amount of 1.5 times the amount of the slurry were charged, and dispersion was conducted for 2 hours with a sand mill (a product of Yasukawa Electric Corporation). The beads were removed to obtain a monomer dispersion B containing 60 wt % of the titanium dioxide fine particles. Using the monomer dispersion B containing 60 wt % of the titanium dioxide fine particles, White Ink Composition 6 (Comparative Example 3) was prepared with the following composition. Specifically, diethylene glycol diethyl ether, γ-butyrolactone, tetraethylene glycol dimethyl ether and a surfactant were dispensed in a vessel, and stirred and mixed for 30 minutes with a magnetic stirrer to sufficiently mix. 40 parts by weight of the dispersion B were added to the resulting mixture, followed by stirring and mixing for 1 hour. A product obtained was filtered using a 10 μm PTFE-made membrane filter to obtain White Ink Composition 6 (Comparative Example (2-3)).

White Ink Compositions 7 (Comparative Example (2-4)) and 8 (Comparative Example (2-5)) were prepared in the same manner as above.

White Ink Composition 6: Comparative Example (2-3)

| | |
|---|---|
| Titanium dioxide fine particles | 15.0 wt % |
| Polyoxyalkylene-added polyalkylene amine | 5.0 wt % |
| (DISCOL N-518, a product of Dai-Ichi Kogyo Seiyaku Co., Ltd.) | |
| Diethylene glycol diethyl ether | 56 wt % |
| γ-Butyrolactone | 12 wt % |
| Tetraethylene glycol dimethyl ether | 11.8 wt % |
| Surfactant | 0.2 wt % |
| (BYK-UV3500, a product of BYK-Chemie, Japan) | |

White Ink Composition 7: Comparative Example (2-4)

| | |
|---|---|
| Titanium dioxide fine particles | 15.0 wt % |
| Polyoxyalkylene-added polyalkylene amine | 5.0 wt % |
| (DISCOL N-518, a product of Dai-Ichi Kogyo Seiyaku Co., Ltd.) | |
| Diethylene glycol diethyl ether | 56.0 wt % |
| γ-Butyrolactone | 11 wt % |
| Tetraethylene glycol dimethyl ether | 10.8 wt % |
| Surfactant | 0.2 wt % |
| (BYK-UV3500, a product of BYK-Chemie, Japan) | |
| Resin | 2.0 wt % |
| (Cellulose acetate butyrate, degree of butylation: 50 to 54%, a product of Kanto Chemical Co., Inc.) | |

White Ink Composition 8: Reference Example

| | |
|---|---|
| Titanium dioxide fine particles | 15.0 wt % |
| Polyoxyalkylene-added polyalkylene amine | 5.0 wt % |
| (DISCOL N-518, a product of Dai-Ichi Kogyo Seiyaku Co., Ltd.) | |
| Diethylene glycol diethyl ether | 55.0 wt % |
| γ-Butyrolactone | 10 wt % |
| Tetraethylene glycol dimethyl ether | 9.8 wt % |
| Surfactant | 0.2 wt % |
| (BYK-UV3500, a product of BYK-Chemie, Japan) | |
| Polyacryl polyol-type resin emulsion | 5.0 wt % |
| (N-2043-AF-1, a product of Harima Chemicals, Inc.) | |

Examples (2-4) and (2-5)

Each white ink composition of the following Examples (2-4) and (2-5) was prepared as follows.

White Ink Composition 9: Example (2-4)

| | |
|---|---|
| Hollow Resin Emulsion 1 | 15 wt % |
| Diethylene glycol diethyl ether | 60 wt % |
| Dipropylene glycol monomethyl ether | 20.8 wt % |
| Surfactant | 0.2 wt % |
| (BYK-UV3500, a product of BYK-Chemie, Japan) | |
| Polyacryl polyol-type resin emulsion | 3.0 wt % |
| (N-2043-60MEX, a product of Harima Chemicals, Inc.) | |

White Ink Composition 10: Example (2-5)

| | |
|---|---|
| Hollow Resin Emulsion 1 | 15 wt % |
| Diethylene glycol diethyl ether | 60 wt % |
| γ-Butyrolactone | 11 wt % |
| Tetraethylene glycol dimethyl ether | 10.8 wt % |
| Surfactant | 0.2 wt % |
| (BYK-UV3500, a product of BYK-Chemie, Japan) | |
| Polyacryl polyol-type resin emulsion | 3.0 wt % |
| (N-2043-60MEX, a product of Harima Chemicals, Inc.) | |

Printing Evaluation

Using an ink-jet printer SJ-540, a product of Roland D. G., Black Ink Composition 1 was charged in a black line, and solid image printing was conducted at a heating temperature of 50° C. Recording media used were a PET film (PG-50L, a product of Lami Corporation Inc.), and a polycarbonate film (YUPIRON, a product of Mitsubishi Engineering-Plastics Corporation), all cut to an A4 size. Subsequently, White Ink Compositions 2 to 10 were successively charged in the black lines, and printing evaluation was conducted.

Whiteness and Shielding Property Evaluation

The sample printed on the transparent recording medium in the printing evaluation was set on a black printed matter having OD value of 1.7, and L* value was measured using a spectrophotometer SPM-50, a product of GRETAG-Macbeth. The L* value is an index of whiteness, and whiteness is excellent as the value is large. Here, when a white sample is sandwiched between the black printed matter and the spectrophotometer, and the L* value is measured, a white printed sample shields the background black printed matter. As a result, whiteness and shielding property can simultaneously be measured.

Press Life Test

Fixability Evaluation Index:

AA: Peeling of white pigment is not observed at all even when rubbed with BEMCOT M-3 (a product of Asahi Kasei Corporation) twenty times.

A: Peeling of white pigment is not observed even when rubbed with BEMCOT M-3 ten times, but peeling is observed when rubbed with BEMCOT M-3 twenty times.

B: Peeling of white pigment is observed when rubbed with BEMCOT M-3.

C: White pigment is wiped off from a recording medium to disappear when rubbed with BEMCOT M-3.

Sedimentation Property Evaluation

Each of Ink Compositions 1 to 10 was dispensed in a 110 ml sample bottle, and allowed to stand for one week, and the state of the ink composition in the sample bottle was observed.

Index of Sedimentation Property Evaluation:

A: Precipitate is not observed at the bottom of the sample bottle.

B: Precipitate is observed at the bottom of the sample bottle, and transparent portion is formed at the upper part of the ink composition.

C: White pigment is all precipitated on the bottom of the sample bottle, and a white pigment and an ink solvent are separated in two layers.

The evaluation results by the above evaluation methods are shown in Table 2 below.

TABLE 2

|  | Ink composition | Press life test | | Sedimentation property test | Evaluation of whiteness and shielding property (L* value) |
| --- | --- | --- | --- | --- | --- |
|  |  | PG-50L | FE-2000 |  |  |
| Example (2-1) | White Ink 1 | AA | AA | A | 77 |
| Example (2-2) | White Ink 2 | AA | AA | A | 78 |
| Example (2-3) | White Ink 3 | A | A | A | 74 |
| Example (2-4) | White Ink 9 | AA | AA | A | 74 |
| Example (2-5) | White Ink 10 | AA | AA | A | 75 |
| Comparative Example (2-1) | White Ink 4 | C | C | A | 79 |
| Comparative Example (2-2) | White Ink 5 | B | B | A | 78 |
| Comparative Example (2-3) | White Ink 6 | C | C | C | 70 |
| Comparative Example (2-4) | White Ink 7 | B | B | B | 66 |
| Reference Example | White Ink 8 | A | A | C | 68 |

As is apparent from Table 2, when an ink composition comprising a mixture of a hollow resin emulsion, a resin emulsion and other additives was used (Examples (2-1) to (2-5)), good results were obtained in both the press life test and the sedimentation property test.

Contrary to this, of the hollow resin emulsion and the resin emulsion, when the resin emulsion was not used (Comparative Examples (2-1) and (2-2)), good result was obtained in the sedimentation property test, but good result was not obtained in the press life test. Furthermore, when the hollow resin emulsion and the resin emulsion were not used (Comparative Examples (2-3) and (2-4)), good results were not obtained in both the press life test and the sedimentation property test. When the emulsion resin was used, but the hollow resin emulsion was not used (Reference Example), the press life test was good, but good result was not obtained in the sedimentation property test.

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2007-010673 (filed Jan. 19, 2007), 2007-054383 (filed Mar. 5, 2007) and 2007-271361 (filed Oct. 18, 2007), and the contents thereof are herein incorporated by reference.

What is claimed is:

1. An oil-based ink composition for ink-jet recording comprising a coloring material, an organic solvent, a non-aqueous resin emulsion, and a silicone surfactant wherein the oil-based ink composition contains, as the organic solvent, at least one of a diethylene glycol compound and a dipropylene glycol compound in a content of 53.8% to 86.8% by weight based on the weight of the whole ink composition.

2. The oil-based ink composition for ink-jet recording as claimed in claim 1, wherein the resin constituting the non-aqueous resin emulsion is a polyacryl polyol resin.

3. The oil-based ink composition for ink-jet recording as claimed in claim 1 or 2, wherein the dispersion medium of the non-aqueous resin emulsion is an aliphatic hydrocarbon and/or an alicyclic hydrocarbon.

4. The oil-based ink composition for ink-jet recording as claimed in claim 3, wherein the aliphatic hydrocarbon is a linear alkane and/or a branched alkane.

5. The oil-based ink composition for ink-jet recording as claimed in claim 3, wherein the alicyclic hydrocarbon is an alkyl cyclohexane.

6. The oil-based ink composition for ink-jet recording as claimed in claim 1, which is a white ink wherein the coloring material contains a hollow resin emulsion.

7. An ink container containing the oil-based ink composition as claimed in claim 1.

8. An ink-jet recording apparatus provided with the oil-based ink composition as claimed in claim 1.

9. The oil-based ink composition for ink-jet recording as claimed in claim 1, wherein the silicone surfactant is a polyester-modified silicone or a polyether-modified silicone.

* * * * *